United States Patent
Kono et al.

(10) Patent No.: US 8,263,728 B2
(45) Date of Patent: Sep. 11, 2012

(54) METHOD FOR PRODUCING POLYESTER RESIN

(75) Inventors: Yuichi Kono, Wakayama (JP); Kazuma Yoshida, Wakayama (JP); Hidekazu Yawata, Wakayama (JP); Seiki Yoshioka, Ibaraki (JP); Shinpei Oota, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 13/132,406

(22) PCT Filed: Nov. 26, 2009

(86) PCT No.: PCT/JP2009/006405
§ 371 (c)(1),
(2), (4) Date: Jun. 2, 2011

(87) PCT Pub. No.: WO2010/064390
PCT Pub. Date: Jun. 10, 2010

(65) Prior Publication Data
US 2011/0237771 A1    Sep. 29, 2011

(30) Foreign Application Priority Data
Dec. 2, 2008  (JP) .................... 2008-307353

(51) Int. Cl.
*C08G 64/00* (2006.01)
*C08G 63/02* (2006.01)

(52) U.S. Cl. ...... 528/176; 528/271; 528/272; 528/308.8

(58) Field of Classification Search .................. 528/176, 528/271, 272, 308.8
See application file for complete search history.

(56) References Cited

U.S. PATENT DOCUMENTS

| | | | |
|---|---|---|---|
| 4,824,606 A | 4/1989 | O'Lenick, Jr. et al. | |
| 2007/0100124 A1 | 5/2007 | Maeda et al. | |
| 2008/0182194 A1 | 7/2008 | Shirai et al. | |

FOREIGN PATENT DOCUMENTS

| | | |
|---|---|---|
| JP | 48 029735 | 4/1973 |
| JP | 54 057594 | 5/1979 |
| JP | 64 026633 | 1/1989 |
| JP | 06 138702 | 5/1994 |
| JP | 09 095466 | 4/1997 |
| JP | 2002 304019 | 10/2002 |
| JP | 2003 119257 | 4/2003 |
| JP | 2003 255602 | 9/2003 |
| JP | 3690255 | 8/2005 |
| JP | 2008 185968 | 8/2008 |
| WO | 2004 111105 | 12/2004 |

OTHER PUBLICATIONS

International Search Report issued Dec. 28, 2009 in PCT/JP09/006405 filed Nov. 26, 2009.
International Perliminary Report on Patentability issued Jul. 5, 2011 in PCT/JP09/006405 filed Nov. 26, 2009.

*Primary Examiner* — Terressa Boykin
(74) *Attorney, Agent, or Firm* — Oblon, Spivak, McClelland, Maier & Neustadt, L.L.P.

(57) ABSTRACT

A method for producing polyester resin includes: esterifying an alcoholic component, and an acid component containing polyvalent carboxylic acid and/or an ester-forming derivative thereof in a reaction solution. A condition of reaction pressure is changed from a pressurized state to a normal pressure state, or to a depressurized state under a condition (I) that an acid-based extent of reaction of the esterification is 76-94%, and a condition (II) that an undissolved acid component is present in the reaction solution.

11 Claims, No Drawings

METHOD FOR PRODUCING POLYESTER RESIN

TECHNICAL FIELD

The present invention relates to a method for producing polyester resin by esterifying an alcoholic component, and an acid component containing a polyvalent carboxylic acid and/or an ester-forming derivative thereof.

BACKGROUND ART

Polyester resins have widely been used as materials of bottles, films, fibers, toner binders, etc.

Patent Document 1 teaches a method for producing the polyester resin. According to this method, bisphenol A and terephthalic acid are introduced in a reactor, and pressure in the reactor is increased while stirring the materials to esterify them. A catalyst is then added to the reactor, the reactor is evacuated, and a diol component is removed from the reaction system to condensation-polymerize the remaining product.

Patent Document 2 teaches a method of mixing ethylene glycol and dicarboxylic acid, esterifying the materials in a normal pressure state or a pressurized state, and condensation-polymerizing the resulting product with the normal pressure state changed to a depressurized state.

Patent Document 3 teaches a method of mixing ethylene glycol and terephthalic acid, esterifying the materials in a pressurized state while water is removed from the system by evaporation at all times to obtain a low molecular weight condensate, and adding a catalyst to the low molecular weight condensate to condensation-polymerize the low molecular weight condensate.

Citation List
Patent Documents
[Patent Document 1] Japanese Patent Publication No. H06-138702
[Patent Document 2] Japanese Patent No. 3690255
[Patent Document 3] International Patent Publication No. WO2004/111105

SUMMARY OF THE INVENTION

The present invention is directed to a method for producing polyester resin by esterifying an alcoholic component, and an acid component containing a polyvalent carboxylic acid and/or an ester-forming derivative thereof in a reaction solution, wherein a condition of reaction pressure is changed from a pressurized state to a normal pressure state, or to a depressurized state under a condition (I) that an acid-based extent of reaction of the esterification is 76-94%, and a condition (II) that an undissolved acid component is present in the reaction solution.

DESCRIPTION OF EMBODIMENTS

An embodiment will be described below.

A method for producing polyester resin of the present embodiment is a method for producing polyester resin for a toner binder, for example.

According to the method for producing polyester resin of the present embodiment, an alcoholic component, and an acid component containing a polyvalent carboxylic acid and/or an ester-forming derivative thereof in a reaction solution are esterified. A condition of reaction pressure is changed from a pressurized state to a normal pressure state, or to a depressurized state under a condition (I) that an acid-based extent of reaction of the esterification is 76-94%, and a condition (II) that an undissolved acid component is present in the reaction solution.

Thus, the esterification is caused in the pressurized state until the predetermined conditions are met, and then the esterification is caused in the normal pressure state or the depressurized state after the predetermined conditions are met. This allows production of the polyester resin with high productivity.

In view of chemical equilibrium, the esterification is accelerated when the reaction pressure is reduced, and dehydration is performed. However, according to the method for producing the polyester resin of the present embodiment, the esterification is accelerated by causing the esterification in the pressurized state until the predetermined conditions are met. This is presumably because a solid acid component dispersed in the reaction solution is dissolved in water produced by the esterification, thereby increasing reactivity of the acid component.

<Alcoholic Component>

Examples of the alcoholic component include, for example, an alkylene oxide adduct of bisphenol A represented by the following chemical formula (I):

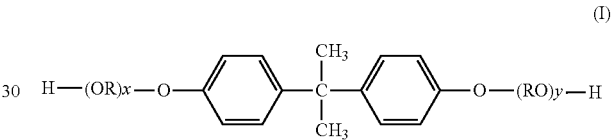

(where RO is alkylene oxide, R is an alkylene group having a carbon number of 2 or 3, x and y are positive integers indicating an average molar number of alkylene oxide added, and a sum of x and y is 1-16, preferably 1.5-5).

Examples of the alkylene oxide adduct of bisphenol A include, for example, ethylene oxide adducts in which R has a carbon number of 2, such as polyoxyethylene-2,2-bis(4-hydroxyphenyl)propane, and prolylene oxide adducts in which R has a carbon number of 3, such as polyoxypropylene-2,2-bis(4-hydroxyphenyl)propane.

Other examples of the alcoholic component include, for example, diols such as ethylene glycol, diethylene glycol, triethylene glycol, 1,2-propylene glycol, 1,3-propylene glycol, 1,4-butanediol, 2,3-butanediol, neopentyl glycol, 1,4-butenediol, 2,3-pentanediol, 1,5-pentanediol, 1,6-hexanediol, etc., triols such as glycerin, pentaerythritol, etc., bisphenol A, hydrogenated bisphenol A, etc.

Among them, secondary alcohols such as 1,2-propylene glycol, 2,3-butanediol, glycerin, 2,3-pentanediol, etc., have low reactivity, and requires long reaction time. Thus, when the alcoholic component includes the secondary alcohol, the esterification is significantly accelerated. The esterification is more significantly accelerated when the alcoholic component includes secondary alcohol having a pair of secondary carbon atoms which are adjacent and are coupled to each other, and to each of which a hydroxy group is coupled, i.e., secondary alcohol in which a secondary hydroxy group is coupled to each of adjacent carbon atoms, such as 2,3-butanediol, 2,3-pentanediol.

The alcoholic component may include a single alcoholic component, or two or more alcoholic components. In the latter case, the two or more alcoholic components may be introduced at different times.

<Acid Component>

The acid component includes a polyvalent carboxylic acid and/or an ester-forming derivative thereof.

Examples of the polyvalent carboxylic acid include, for example, aromatic dicarboxylic acid such as phthalic acid, isophthalic acid, terephthalic acid, etc.; aliphatic dicarboxylic acid such as oxalic acid, malonic acid, maleic acid, fumaric acid, citraconic acid, itaconic acid, glutaconic acid, succinic acid, adipic acid, dodecenyl succinic acid, octyl succinic acid, etc.; tricarboxylic acid such as 1,2,4-benzenetricarboxylic acid (trimellitic acid), 2,5,7-naphthalene tricarboxylic acid, etc.; and tetracarboxilic acid such as pyromellitic acid.

Examples of the ester-forming derivative of polyvalent carboxylic acid include, for example, anhydride of polyvalent carboxylic acid, alkyl ester, etc.

Particularly high productivity can be obtained when the acid component is solid in the reaction field. A volume mean particle size of the solid acid component is preferably 500 μm or smaller, more preferably 200 μm or smaller, in view of solubility. The volume mean particle size is preferably 5 μm or larger, more preferably 10 μm or larger, because the amount of fine powder can be reduced, and the acid component can be handled easily.

The acid component may include a single polyvalent carboxylic acid or ester-forming derivative thereof, or two or more polyvalent carboxylic acids and/or ester-forming derivatives thereof. In the latter case, the two or more polyvalent carboxylic acids and/or ester-forming derivatives may be introduced at different times.

The acid component may additionally include an acid other than polyvalent carboxylic acid, and an ester-forming derivative thereof. Examples of such an acid component include, for example, rosin. Rosin preferably has an acid value of 100-200 mgKOH/g, more preferably 150-170 mgKOH/g. In this case, the other acid component may be introduced at a different time from the introduction of the polyvalent carboxylic acid and/or the ester-forming derivative thereof.

<Ratio Between Alcoholic Component and Acid Component Introduced>

The alcoholic component and the acid component are preferably introduced in the ratio of 1.0-3.0, more preferably 1.05-2.0 (molar ratio of alcoholic component/acid component).

When the alcoholic component is the alkylene oxide adduct of bisphenol A, the ratio between the alkylene oxide adduct of bisphenol A, and polyvalent carboxylic acid and/or an ester-forming derivative thereof as the acid component is preferably 1.0-3.0, more preferably 1.05-2.5 (molar ratio of the alkylene oxide adduct of bisphenol A/polyvalent carboxylic acid and/or the ester-forming derivative thereof).

<Other Components>

The reaction solution may further contain a solvent, an esterification catalyst, etc.

Examples of the esterification catalyst include, for example, tin compounds, titanium compounds, etc. Examples of organic tin compounds include, for example, monobutyltin, tributyltin, dibutyltin oxide, etc. Examples of inorganic tin include, for example, tin oxide such as tin 2-ethylhexanoate. According to the method for producing the polyester resin of the present embodiment, productivity increases when the esterification occurs at a slightly low reaction rate in the presence of an inorganic tin catalyst.

Water in the liquid state, or in the vapor state may be added from outside to the reaction solution. Water is preferably added to the reaction solution when the acid-based extent of reaction of the esterification is 50% or lower, more preferably before heating the reaction solution. The addition of water can further accelerate the esterification in an early stage thereof.

<Reaction Temperature>

Reaction temperature is preferably 200° C. or higher, more preferably 210° C. or higher, particularly preferably 220° C. or higher, in view of acceleration of the reaction rate of the esterification. The reaction temperature is preferably 260° C. or lower, more preferably 250° C. or lower, particularly preferably 245° C. or lower, in view of reduction of side reactions. When two or more alcoholic components and/or two or more acid components are introduced at different times, the reaction temperature may be changed in response to the introduction of them.

<Reaction Pressure>

The reaction pressure in the pressurized state in the early stage of the esterification is preferably 0.2 MPa·abs or higher, more preferably 0.3 MPa·abs or higher, particularly preferably 0.4 MPa·abs or higher, in view of acceleration of dissolution of the solid acid component in the reaction solution. The increased pressure is preferably 1.1 MPa·abs or lower, more preferably 0.8 MPa·abs or lower, particularly preferably 0.6 MPa·abs or lower in view of resistance of the reactor to pressure, and acceleration of the forward reaction rate of the esterification. The term abs designates absolute pressure. In the following description, the term abs is omitted, but the unit of the pressure is the absolute pressure at any time.

To set the condition of the reaction pressure to the pressurized state in the early stage of the esterification, the reactor is preferably pressurized by inert gas described later before the esterification starts. In particular, the esterification is preferably caused in the presence of the inert gas when the acid-based extent of reaction of the esterification is 20% or lower. This can further accelerate the esterification.

The reaction pressure in the normal pressure state or the depressurized state in the late stage of the esterification is preferably 30 kPa or lower, more preferably 15 kPa or lower, in view of acceleration of the forward reaction rate of the esterification. Further, the reaction pressure in the normal pressure state or the depressurized state is preferably 3 kPa or higher, more preferably 5 kPa or higher, in view of reduction of a load applied to a vacuum device.

According to the method for producing the polyester resin of the present embodiment, the condition of the reaction pressure is the pressurized state in the early stage of the esterification, i.e., for a period during which the undissolved acid component is present in the reaction solution (all or part of the period during which the undissolved acid component is present in the reaction solution). Further, the condition of the reaction pressure is changed to the normal pressure state or the depressurized state in the late stage of the esterification, i.e., when the undissolved acid component is reduced. This allows production of the polyester resin with high productivity.

<Time to Change Pressure>

The reaction in the pressurized state will be referred to as reaction I, and the reaction in the normal pressure state or the depressurized state will be referred to as reaction II.

The reaction I includes reaction in a static pressurized state (reaction I-a) which is performed in an approximately constant pressure state, and reaction at a reducing pressure (reaction I-b) which is performed while the pressure kept constant in the reaction I-a is reduced to normal pressure. The reaction pressure in the pressurized state is not limited to those in the reaction I-a and the reaction I-b. For example, the reaction pressure in the pressurized state may be increased or decreased with time.

The reaction II includes reaction in the normal pressure state (reaction II-a), and reaction in the depressurized state (reaction II-b).

Time to change the pressure is time to change the reaction I to the reaction II, and time at which the condition (I) that the acid-based extent of reaction of the esterification is 76-94%, and the condition (II) that the undissolved acid component is present in the reaction solution are met.

The acid-based extent of reaction of the esterification can be obtained by sampling the reaction solution, and analyzing an acid value of unreacted acid component. The acid value can be measured by a method of JIS K0070. Alternatively, the acid value can be obtained by calculation based on a sum of the amount of evaporated water, and the amount of water in the reaction solution.

Whether or not the undissolved acid component is present in the reaction solution can be checked by sampling the reaction solution, or by visually observing whether the reaction solution is cloudy or transparent through a sight glass of the reactor.

The pressure is changed at a point of time when the acid-based extent of reaction of the esterification is 94% or lower, preferably 90% or lower, more preferably 87% or lower, to accelerate the forward reaction of the esterification. Further, the pressure is preferably changed at a point of time when the acid-based extent of reaction of the esterification is 76% or higher, preferably 78% or higher, more preferably 80% or higher, to reduce the undissolved acid component.

For reduction of reaction time, the pressure is preferably changed quickly when the acid-based extent of reaction of the esterification is in the above-described range. Changing the pressure after the acid component is dissolved and the reaction solution becomes transparent is not preferable because the reaction time disadvantageously increases.

All the Patent Documents 1-3 described above fail to teach or suggest when to change the condition of the reaction pressure from the pressurized state to the normal pressure state or to the depressurized state, and how the reaction in the pressurized state is performed.

<Replacement of Gas>

The air in the reactor is preferably replaced with inert gas before the heating to prevent coloring of the produced polyester resin etc. The inert gas may be gas which does not substantially affect the esterification and the side reactions, e.g., nitrogen, argon, etc.

<Polyester Resin>

The polyester resin produced in the above-described manner preferably has a glass transition point (Tg) of 35-70° C., more preferably 40-65° C., in view of fixability and storage stability. The polyester resin preferably has a softening point (Tm) of 60-160° C., more preferably 85-155° C., in view of the fixability.

The polyester resin produced by the method for producing the polyester resin of the present embodiment can be used as a toner binder, for example, and is processed into a toner by adding thereto a colorant, a mold release agent, a charge control agent, a conductive modifier, an extender, a reinforcing filler such as a fibrous material etc., an antioxidant, an age resistor, etc.

EXAMPLES (Production of Polyester Resin)

Polyester resins were produced in Examples 1-5, Comparative Examples 1-3, and Reference Example 1 described below. Tables 1 and 2 show compositions and components of reaction solutions.

Example 1

To a 1 L reactor, 160 g of polyoxypropylene-(2,4)-2,2-bis(4-hydroxyphenyl)propane (trade name: G-1652, manufactured by Kao Corporation), and 276 g of polyoxyethylene-(2,4)-2,2-bis(4-hydroxyphenyl)propane (trade name: G-1672, manufactured by Kao Corporation) as alcoholic components, and 205 g of terephthalic acid (volume mean particle size: 115 μm) as an acid component were introduced to prepare a reaction solution of Composition 1-1. A total amount of the prepared reaction solution was 641 g.

As an esterification catalyst, 3.2 g of tin 2-ethylhexanoate (trade name: Neostann E-80, manufactured by Nitto Kasei Co., Ltd.) was introduced. An operation of pressurizing the reactor by nitrogen gas, and returning to normal pressure was performed two or more times.

With pressure of the reactor set to 0.40 MPa, the pressure was increased to 0.40 MPa by the nitrogen gas, revolutions of a stirrer was set to 300 rpm, and heating of the reaction solution was started. The temperature in the reactor reached 235° C. after 48 minutes, and that point of time was regarded as a start of the esterification. The pressure in the reactor at the start of the esterification was 0.40 MPa. Then, esterification was caused while the reaction temperature was kept at 235° C., and the reaction pressure was kept at 0.40 MPa.

After 2.5 hours from the start of the esterification, the reaction pressure in the reactor was gradually reduced. At that point of time, the acid-based extent of reaction of the esterification was 69.0%. The reaction solution was cloudy, and a large amount of undissolved acid component was found.

After 3.5 hours from the start of the esterification, the reaction pressure reached normal pressure (0.10 MPa). The acid-based extent of reaction of the esterification at that point of time was 82.8%. The reaction solution was transparent, but the undissolved acid component dispersed therein was found.

Then, the esterification was continued for 2.0 hours with the reaction temperature kept at 235° C., and the reaction pressure kept at normal pressure. The acid-based extent of reaction of the esterification was 94.4% after 5.5 hours from the start of the esterification. The reaction solution was transparent, in which the undissolved acid component was not found.

From the start of the esterification, 3.2 hours was taken until the acid-based extent of reaction of the esterification reached 80%, and, 4.3 hours was taken until the acid-based extent of reaction of the esterification reached 90%.

Example 2

To a 2 L reactor, 673 g of polyoxypropylene-(2,4)-2,2-bis(4-hydroxyphenyl)propane (trade name: G-1652, manufactured by Kao Corporation), and 270 g of polyoxyethylene-(2,4)-2,2-bis(4-hydroxyphenyl)propane (trade name: G-1672, manufactured by Kao Corporation) as the alcoholic components, and 232 g of terephthalic acid (volume mean particle size: 115 μm), and 286 g of tetrapropenylsuccinic anhydride as the acid components were introduced to prepare a reaction solution of Composition 2. A total amount of the prepared reaction solution was 1461 g.

As an esterification catalyst, 7.4 g of tin 2-ethylhexanoate (trade name: Neostann E-80, Manufactured by Nitto Kasei Co., Ltd.) was introduced. An operation of pressurizing the reactor by nitrogen gas, and returning to normal pressure was performed two or more times.

Then, with the pressure of the reactor set to 0.45 MPa, the pressure was increased to 0.45 MPa by the nitrogen gas, the revolutions of the stirrer was set to 300 rpm, and heating of the reaction solution was started. The temperature in the reactor reached 235° C. after 154 minutes, and that point of time was regarded as a start of the esterification. The pressure in the reactor at the start of the esterification was 0.45 MPa. The esterification was caused with the reaction temperature kept at 235° C., and the reaction pressure kept at 0.45 MPa.

After 1.8 hours from the start of the esterification, the reaction pressure in the reactor was gradually reduced. The acid-based extent of reaction of the esterification at that point of time was 64.2%. The reaction solution was cloudy, in which a large amount of undissolved acid component was found.

After 3.0 hours from the start of the esterification, the reaction pressure reached normal pressure. The acid-based extent of reaction of the esterification at that point of time was 85.8%. The reaction solution was transparent, but the undissolved acid component dispersed therein was found.

Then, the esterification was continued for 1.5 hours with the reaction temperature kept at 235° C., and the reaction pressure kept at 8.0 kPa. The acid-based extent of reaction of the esterification was 98.0% after 4.5 hours from the start of the esterification. The reaction solution was transparent, in which the undissolved acid component was not found.

From the start of the esterification, 3.5 hours was taken until the acid-based extent of reaction of the esterification reached 90%.

Example 3

To a 2 $m^3$ reactor, 471 Kg of polyoxypropylene-(2,4)-2,2-bis(4-hydroxyphenyl)propane (trade name: G-1652, manufactured by Kao Corporation), and 812 Kg of polyoxyethylene-(2,4)-2,2-bis(4-hydroxyphenyl)propane (trade name: G-1672, manufactured by Kao Corporation) as the alcoholic components, and 600 Kg of terephthalic acid (volume mean particle size: 115 μm) as the acid component were introduced to prepare a reaction solution of Composition 1-2. A total amount of the prepared reaction solution was 3344 Kg.

As an esterification catalyst, 9.4 Kg of tin 2-ethylhexanoate (trade name: Neostann E-80, Manufactured by Nitto Kasei Co., Ltd.) was introduced. An operation of pressurizing the reactor by nitrogen gas, and returning to normal pressure was performed two or more times.

Then, with the pressure of the reactor set to 0.30 MPa, the pressure was increased to 0.30 MPa by the nitrogen gas, the revolutions of the stirrer was set to 50 rpm, and heating of the reaction solution was started. The temperature in the reactor reached 235° C. after 95 minutes, and that point of time was regarded as a start of the esterification. The pressure in the reactor at the start of the esterification was 0.30 MPa. The esterification was caused with the reaction temperature kept at 235° C., and the reaction pressure kept at 0.30 MPa.

After 4.0 hours from the start of the esterification, the reaction pressure in the reactor was gradually reduced. The acid-based extent of reaction of the esterification at that point of time was 84.0%. The reaction solution was transparent, but the undissolved acid component dispersed therein was found.

After 5.0 hours from the start of the esterification, the reaction pressure reached normal pressure. The acid-based extent of reaction of the esterification at that point of time was 84.5%. The reaction solution was transparent, but the undissolved acid component dispersed therein was found.

Then, the esterification was continued for 3.3 hours with the reaction temperature kept at 235° C., and the reaction pressure kept at 10.7 kPa. The acid-based extent of reaction of the esterification was 97.8% after 8.3 hours from the start of the esterification. The reaction solution was transparent, in which the undissolved acid component was not found.

From the start of the esterification, 2.7 hours was taken until the acid-based extent of reaction of the esterification reached 80%, and 5.8 hours was taken until the acid-based extent of reaction of the esterification reached 90%.

Example 4

To a 2 $m^3$ reactor, the reaction solution of Composition 1-2, and the esterification catalyst same as those of Example 3 were introduced. An operation of pressurizing the reactor by nitrogen gas, and returning to normal pressure was performed two or more times.

With the pressure of the reactor set to normal pressure, and the revolutions of the stirrer set to 50 rpm, heating of the reaction solution was started. As the heating proceeded, the pressure in the reactor gradually increased. Once the pressure reached 0.30 MPa, the pressure in the reactor was kept constant at 0.30 MPa. The temperature in the reactor reached 235° C. after 95 minutes, and that point of time was regarded as a start of the esterification. The esterification was caused with the reaction temperature kept at 235° C., and the reaction pressure kept at 0.30 MPa.

After 5.0 hours from the start of the esterification, the reaction pressure in the reactor was gradually reduced. The acid-based extent of reaction of the esterification at that point of time was 84.5%. The reaction solution was transparent, but the undissolved acid component dispersed therein was found.

The reaction pressure reached the normal pressure after 5.3 hours from the start of the esterification. The acid-based extent of reaction of the esterification at that point of time was 85.0%. The reaction solution was transparent, but the undissolved acid component dispersed therein was found.

Then, the esterification was continued for 2.0 hours with the reaction temperature kept at 235° C., and the reaction pressure kept at normal pressure, and then the esterification was further continued for 2.0 hours at the reaction pressure of 10.7 kPa. The acid-based extent of reaction of the esterification was 98.0% after 9.3 hours from the start of the esterification. The reaction solution was transparent, in which the undissolved acid component was not found.

After the start of the esterification, 3.0 hours was taken until the acid-based extent of reaction of the esterification reached 80%, and 6.4 hours was taken until the acid-based extent of reaction of the esterification reached 90%.

Example 5

To a 2 L reactor, 330 g of 1,2-propanediol, and 400 g of 2,3-butanediol as the alcoholic components, and 1100 g of terephthalic acid (volume mean particle size: 115 μm) as the acid component were introduced to prepare a reaction solution of Composition 3. A total amount of the prepared reaction solution was 1830 g.

As an esterification catalyst, 8.0 g of tin 2-ethylhexanoate (trade name: Neostann E-80, Manufactured by Nitto Kasei Co., Ltd.) was introduced. An operation of pressurizing the reactor by nitrogen gas, and returning to normal pressure was performed two or more times.

With the pressure of the reactor set to normal pressure, and the revolutions of the stirrer set to 300 rpm, heating of the reaction solution was started. Then, the temperature in the reactor reached 200° C., and production of water was observed. That point of time was regarded as a start of the esterification. After the start of the esterification, heating to a temperature of 210° C. was started. As the heating proceeded, the pressure in the reactor gradually increased. Once the pressure reached 0.45 MPa, the pressure in the reactor was kept constant at 0.45 MPa. The temperature reached 210° C. after 7.5 hours from the start of the esterification. The etherification was continued while that state was kept for 2 hours.

After 9.5 hours from the start of the esterification, it was observed that the production of water was almost finished, and the reaction pressure in the reactor was gradually reduced. The reaction solution was cloudy, in which a large amount of undissolved acid component was found.

The reaction pressure was reached normal pressure after 10.5 hours from the start of the esterification. The acid-based extent of reaction of the esterification at that point of time was 83.5%. The reaction solution was transparent, but the undissolved acid component dispersed therein was found.

Then, the esterification was continued for 0.5 hours with the reaction temperature kept at 210° C., and the reaction pressure kept at 80.0 kPa. The acid-based extent of reaction of the esterification was 95.2% after the start of the esterification. The reaction solution was transparent, in which the undissolved acid component was not found.

After the start of the esterification, 10 hours was taken until the acid-based extent of reaction of the esterification reached 80%, and 10.8 hours was taken until the acid-based extent of reaction of the esterification reached 90%.

Comparative Example 1

To a 1 L reactor, the reaction solution of Composition 1-1, and the esterification catalyst same as those of Example 1 were introduced. An operation of pressurizing the reactor by nitrogen gas, and returning to normal pressure was performed two or more times.

With the pressure of the reactor set to 0.40 MPa, the pressure was increased to 0.40 MPa by the nitrogen gas, the revolutions of the stirrer was set to 300 rpm, and heating of the reaction solution was started. The temperature in the reactor reached 235° C. after 53 minutes, and that point of time was regarded as a start of the esterification. The pressure in the reactor at the start of the esterification was 0.40 MPa. The esterification was caused with the reaction temperature kept at 235° C., and the reaction pressure kept at 0.40 MPa.

After 1.0 hour from the start of the esterification, the reaction pressure in the reactor was gradually reduced. The acid-based extent of reaction of the esterification at that point of time was 46.8%. The reaction solution was cloudy, in which a large amount of undissolved acid component was found.

The reaction pressure reached normal pressure after 2.0 hours from the start of the esterification. The acid-based extent of reaction of the esterification at that point of time was 70.6%. The reaction solution was cloudy, in which a large amount of undissolved acid component was found.

The esterification was continued for 1.0 hour with the reaction temperature kept at 235° C., and the reaction pressure kept at normal pressure, and then the esterification was further continued for 2.0 hours at the reaction pressure of 10.7 kPa. The acid-based extent of reaction of the esterification was 82.9% after 5.0 hours from the start of the esterification. The reaction solution was transparent, but the undissolved acid component dispersed therein was found.

From the start of the esterification, 4.6 hours was taken until the acid-based extent of reaction of the esterification reached 80%.

Comparative Example 2

To a 1 L reactor, the reaction solution of Composition 1-1, and the esterification catalyst same as those of Example 1 were introduced. An operation of pressurizing the reactor by nitrogen gas, and returning to normal pressure was performed two or more times.

With the pressure of the reactor set to 0.40 MPa, the pressure was increased to 0.40 MPa by the nitrogen gas, the revolutions of the stirrer was set to 300 rpm, and heating of the reaction solution was started. The temperature in the reactor reached 235° C. after 53 minutes, and that point of time was regarded as a start of the esterification. The pressure in the reactor at the start of the esterification was 0.40 MPa. The esterification was caused with the reaction temperature kept at 235° C., and the reaction pressure kept at 0.40 MPa.

After 1.5 hours from the start of the esterification, the reaction pressure in the reactor was gradually reduced. The acid-based extent of reaction of the esterification at that point of time was 55.5%. The reaction solution was cloudy, in which a large amount of undissolved acid component was found.

The reaction pressure reached the normal pressure after 2.5 hours from the start of the esterification. The acid-based extent of reaction of the esterification at that point of time was 75.4%. The reaction solution was cloudy, in which a large amount of undissolved acid component was found.

The esterification was continued for 3.0 hours with the reaction temperature kept at 235° C., and the reaction pressure kept at 10.7 kPa. The acid-based extent of reaction of the esterification was 87.5% after 5.5 hours from the start of the esterification. The reaction solution was transparent, but the undissolved acid component dispersed therein was found.

From the start of the esterification, 4.1 hours was taken until the acid-based extent of reaction of the esterification reached 80%.

Comparative Example 3

To a 2 L reactor, 330 g of 1,2-propanediol, and 400 g of 2,3-butanediol as the alcoholic components, and 1100 g of terephthalic acid (volume mean particle size: 115 μm) as the acid component were introduced to prepare a reaction solution of Composition 3. A total amount of the prepared reaction solution was 1830 g.

As an esterification catalyst, 8.0 g of tin 2-ethylhexanoate (trade name: Neostann E-80, Manufactured by Nitto Kasei Co., Ltd.) was introduced.

With the pressure of the reactor set to normal pressure, and the revolutions of the stirrer set to 300 rpm, heating of the reaction solution was started. Then, the temperature in the reactor reached 200° C., and production of water was observed. That point of time was regarded as a start of the esterification. After the start of the esterification, heating to a temperature of 210° C. was started. The temperature reached 210° C. after 14.8 hours, and the esterification was continued while that state was kept for 3.2 hours.

After 17.0 hours from the start of the esterification, it was observed that the production of water was almost finished. The reaction solution was transparent, in which the undissolved acid component was not found.

The etherification was continued for 0.5 hours with the reaction temperature kept at 210° C., and the reaction pressure kept at 80.0 kPa. The acid-based extent of reaction of the esterification was 95.4% after 17.5 hours from the start of the esterification.

After the start of the esterification, 14.5 hours was taken until the acid-based extent of reaction of the esterification reached 80%, and 17.2 hours was taken until the acid-based extent of reaction of the esterification reached 90%.

Reference Example 1

To a 1 L reactor, the reaction solution of Composition 1-1, and the esterification catalyst same as those of Example 1 were introduced. An operation of pressurizing the reactor by nitrogen gas, and returning to normal pressure was performed two or more times.

With the pressure of the reactor set to normal pressure, and the revolutions of the stirrer set to 300 rpm, heating of the reaction solution was started. As the heating proceeded, the pressure in the reactor gradually increased. Once the pressure reached 0.40 MPa, the pressure in the reactor was kept constant at 0.40 MPa. The temperature in the reactor reached 235° C. after 50 minutes, and that point of time was regarded as a start of the esterification. The pressure in the reactor at the start of the esterification was 0.40 MPa. The esterification was caused with the reaction temperature kept at 235° C., and the reaction pressure kept at 0.40 MPa.

After 7.5 hours from the start of the esterification, the reaction pressure in the reactor was gradually reduced. The reaction solution was transparent, but the undissolved acid component dispersed therein was found.

The reaction pressure was changed to normal pressure after 0.1 hour from the start of the esterification. The acid-based extent of reaction of the esterification at that point of time was 83.9%. The reaction solution was transparent, but the undissolved acid component dispersed therein was found.

Then, the esterification was continued for 1.4 hours with the reaction temperature kept at 235° C., and the reaction pressure kept at normal pressure. The acid-based extent of reaction of the esterification was 93.2% after 9.0 hours from the start of the esterification. The reaction solution was transparent, in which the undissolved acid component was not found.

After the start of the esterification, 7.5 hours was taken until the acid-based extent of reaction of the esterification reached 80%, and 8.1 hours was taken until the acid-based extent of reaction of the esterification reached 90%.

TABLE 1

|  | Composition 1-1 (g) | Composition 2 (g) | Composition 1-2 (Kg) | Composition 3 (g) |
|---|---|---|---|---|
| (1) G-1652 | 160 | 673 | 471 |  |
| (2) G-1672 | 276 | 270 | 812 |  |
| 1,2-propanediol |  |  |  | 330 |
| 2,3-butanediol |  |  |  | 400 |
| (3) TPA | 205 | 232 | 600 | 1100 |
| (4) ASAN-PT |  | 286 |  |  |
| (5) E-80 | 3.2 | 7.4 | 9.4 | 8.0 |

(1) G-1652: polyoxypropylene-(2,4)-2,2-bis(4-hydroxyphenyl)propane
(2) G-1672: polyoxyethylene-(2,4)-2,2-bis(4-hydroxyphenyl)propane
(3) TPA: terephthalic acid
(4) ASAN-PT: tetrapropenylsuccinic anhydride
(5) E-80: tin 2-ethylhexanoate (catalyst)

TABLE 2

|  | Example 1 | Example 2 | Example 3 | Example 4 | Example 5 | Comparative example 1 | Comparative example 2 | Comparative example 3 | Reference example 1 |
|---|---|---|---|---|---|---|---|---|---|
| Composition of reaction solution | 1-1 | 2 | 1-2 | 1-2 | 3 | 1-1 | 1-1 | 3 | 1-1 |
| Pressurization in early stage of heating | Done | Done | Done | Undone | Undone | Done | Done | — | Undone |
| Pressure during reaction in static pressurized state [MPa · abs] | 0.40 | 0.45 | 0.30 | 0.30 | 0.45 | 0.40 | 0.40 | — | 0.40 |
| Reaction time [hr] |  |  |  |  |  |  |  |  |  |
| Reaction I: in pressurized state | 3.5 | 3.0 | 5.0 | 5.3 | 10.5 | 2.0 | 2.5 | — | 7.6 |
| (reaction I-a: in static pressurized state) | (2.5) | (1.8) | (4.0) | (5.0) | (9.5) | (1.0) | (1.5) | — | (7.5) |
| (reaction I-b: at reducing pressure) | (1.0) | (1.2) | (1.0) | (0.3) | (1.0) | (1.0) | (1.0) | — | (0.1) |
| Reaction II: in normal pressure state or depressurized state | 2.0 | 1.5 | 3.3 | 4.0 | 0.5 | 3.0 | 3.0 | 17.5 | 1.4 |
| (reaction II-a: in normal pressure state) | (2.0) | — | — | (2.0) | — | (1.0) | — | (17) | (1.4) |
| (reaction II-b: in depressurized state) | — | (1.5) | (3.3) | (2.0) | (0.5) | (2.0) | (3.0) | (0.5) | — |
| Total | 5.5 | 4.5 | 8.3 | 9.3 | 11.0 | 5.0 | 5.5 | 17.5 | 9.0 |
| Extent of reaction [%] |  |  |  |  |  |  |  |  |  |
| End of reaction I-a | 69.0 | 64.2 | 84.0 | 84.5 | 63.1 | 46.8 | 55.5 | — | — |
| End of reaction I-b | 82.8 | 85.8 | 84.5 | 85.0 | 83.5 | 70.6 | 75.4 | — | 83.9 |
| End of reaction II | 94.4 | 98.0 | 97.8 | 98.0 | 95.2 | 82.9 | 87.5 | 95.4 | 93.2 |
| Undissolved acid component(*) |  |  |  |  |  |  |  |  |  |
| End of reaction I-a | A | A | B | B | A | A | A | — | B |
| End of reaction I-b | B | B | B | B | B | A | A | — | B |
| End of reaction II | None | None | None | None | None | B | B | None | None |
| Time until extent of reaction reached 80% [hr] | 3.2 | — | 2.7 | 3.0 | 10.0 | 4.6 | 4.1 | 14.5 | 7.5 |
| Time until extent of reaction reached 90% [hr] | 4.3 | 3.5 | 5.8 | 6.4 | 10.8 | — | — | 17.2 | 8.1 |

Undissolved acid component(*)
A: reaction solution was cloudy, in which a large amount of undissolved acid component was found.
B: reaction solution was transparent, but the undissolved acid component was dispersed therein.

(Productivity of Polyester Resin)

The results of Examples 1-5, Comparative Examples 1-3, and Reference Example 1 shown in shown in Table 2 indicate the following.

In comparison between Example 1, and Comparative Examples 1 and 2 using the reaction solutions of the same composition, the reaction time of Example 1 in which the reaction I (reaction in the pressurized state) was changed to the reaction II (reaction in the normal pressure state or the depressurized state) when the acid-based extent of reaction of the esterification was 80% or higher was significantly shorter than the reaction time of Comparative Examples 1 and 2 in which the reaction I was changed to the reaction II when the acid-based extent of reaction of the esterification was lower than 80%.

Comparison between Example 1 and Reference Example 1 using the reaction solutions of the same composition indicates that quick change from the reaction I (reaction in the pressurized state) to the reaction II (reaction in the normal pressure state or the depressurized state) is preferable when the acid-based extent of reaction of the esterification was 80% or higher in view of reduction of the reaction time.

Comparison between Examples 3 and 4 using the reaction solutions of the same composition indicates that the reaction time can be reduced by the pressurization in the early stage of the heating.

Industrial Applicability

The present invention is useful for a method for producing polyester resin by esterifying an alcoholic component, and an acid component containing a polyvalent carboxylic acid and/or an ester-forming derivative thereof in a reaction solution.

The invention claimed is:

1. A method for producing polyester resin, comprising:
   esterifying an alcoholic component with an acid component containing at least one of a polyvalent carboxylic acid, and an ester-forming derivative thereof in a reaction solution, and
   changing a reaction pressure from a pressurized state to a normal pressure state, or from a pressurized state to a depressurized state during the esterification,
   wherein
   the change is effected (I) when an extent of the esterification is 76-94%, and (II) an undissolved acid component is present in the reaction solution.

2. The method of claim 1, wherein the reaction pressure in the pressurized state is 0.2-1.1 MPa ·abs.

3. The method of claim 1 or 2, wherein reaction temperature is 200-260° C.

4. The method of claim 1, wherein the alcoholic component comprises an alkylene oxide adduct of bisphenol A.

5. A method for producing polyester resin, comprising:
   esterifying an alcoholic component with an acid component containing at least one of a polyvalent carboxylic acid, and an ester-forming derivative thereof in a reaction solution, and
   changing a reaction pressure from a pressurized state to a normal pressure state, or from a pressurized state to a depressurized state during the esterification,
   wherein
   the change is effected (I) when an extent of the esterification is 76-94%, and (II) an undissolved acid component is present in the reaction solution,
   wherein the alcoholic component comprises an alkylene oxide adduct of bisphenol A, and
   wherein the alkylene oxide adduct of bisphenol A is an ethylene oxide adduct or a propylene oxide adduct of bisphenol A.

6. The method of claim 1, wherein the alcoholic component comprises an alcohol having a pair of adjacent bonded secondary carbon atoms which are each bonded to a hydroxy group.

7. The method of claim 1, wherein the polyvalent carboxylic acid comprises terephthalic acid.

8. The method of claim 1, wherein the esterification is run in the presence of an inert gas when the extent of the esterification is 20% or lower.

9. The method of claim 1, wherein a tin oxide catalyst is present.

10. The method of claim 1, wherein the reaction pressure is changed from a pressurized state to a normal pressure state during the esterification.

11. The method of claim 1, wherein the reaction pressure is changed from a pressurized state to a depressurized state during the esterification.

* * * * *